United States Patent
Feder et al.

(10) Patent No.: US 6,521,699 B2
(45) Date of Patent: Feb. 18, 2003

(54) AQUEOUS SILICONE DISPERSION

(75) Inventors: Michel Feder, Villeurbanne (FR); Philippe Jost, Taluyers (FR); Michel Letoffe, Sainte-Foy-lés-Lyon (FR); Marie-Cécile Duchamp, Caluire (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/844,981

(22) Filed: Apr. 27, 2001

(65) Prior Publication Data

US 2001/0031818 A1 Oct. 18, 2001

Related U.S. Application Data

(63) Continuation of application No. 09/269,359, filed on Jun. 28, 1999, now abandoned.

(30) Foreign Application Priority Data

Sep. 26, 1996 (FR) .................................. 96 11971

(51) Int. Cl.$^7$ ................................. C08K 3/20
(52) U.S. Cl. .................. 524/588; 524/837; 524/838
(58) Field of Search ................. 524/837, 588, 524/838

(56) References Cited

U.S. PATENT DOCUMENTS 5,045,231 A 9/1991 Braun et al.

*Primary Examiner*—Margaret G. Moore

(57) ABSTRACT

The invention concerns a silicon dispersion hardenable by cross-linking and useable particularly as putty, paint or film coating. The dispersion according to the instant invention contains hydroxylated condensable constituents and is free from hydrolyzable substituents capable of being transformed into volatile organic compounds, is free from volatile organic compounds and polyvinil alcohol, and contains an $\alpha,\omega$-diOH polyorganosiloxane (A), an adherence promoter (B) with $NH_2$ functions and OH functions, and, optionally, a catalyst (C), a surfactant (D), a cross-linking agent (E), fillers (F), a dispersing agent (G), a plasticizer (H), an antifungal agent (I), an antifoaming agent (J), a stabilizer (K) or a base (L). The invention is useful for putty or film coatings prepared with this dispersion.

19 Claims, No Drawings

AQUEOUS SILICONE DISPERSION

This application is a continuation application of application Ser. No. 09/269,359 filed on Jun. 28, 1999, now abandoned.

The field of the present invention is that of silicone compositions which are hardenable by cross-linking and which can be used in particular as putty or any other sealing material or to form any type of coating, for example, in paints, are in particular soft Semi-Thick Coatings (STC).

More precisely, the invention relates to an aqueous silicone dispersion which forms an adherent elastomer by elimination of water according to polycondensation mechanisms occurring advantageously at room temperature.

Silicones or polyorganosiloxanes (POS), such as $\alpha,\omega$-(dihydroxy)polydiorganosiloxane, are known to enter into the composition of standard silicone putties comprising, in addition, cross-linking agents of the alkyltrialkoxysilane type, polycondensation catalysts of the tin salt type and fillers. Such compositions have proved not to be very easy to use to make, for example, leaktight seals, films or coatings because their pasty and viscous states make them difficult to handle and to make into a given form.

Furthermore, these compositions have the disadvantage of not being dispersible or soluble in water, which complicates their use, in particular because the tools used for their application are, as a result, not easy to wash with water.

Moreover, these compositions also have the disadvantage of not being "paintable': paints do not stick over.

As regards STCs some are also known which are prepared from emulsions of organic polymers. These STCs are impermeable to water but have shortcomings as regards permeability to steam.

To overcome these serious deficiencies, systems for forming putty or cross-linkable film (STC) have been developed from an aqueous emulsion based on silicone oil which is cross-linkable to an elastomer by condensation (with elimination of water and alcohol for example).

Although they are easier to apply, these aqueous silicone emulsions have raised a number of technical difficulties:
- storage stability of the emulsion,
- excessively long hardening time,
- poor mechanical properties of the elastomer (hardness, elasticity, abrasion resistance),
- defect in thixotropy of the elastomer,
- defect in "paintable" character of the elastomer,
- weak properties of adherence and cohesion of the elastomer onto the customary supports,
- problems of safety and toxicity due to the solvents or to the alcohols formed by hydrolysis,
- and ease of use.

As regards the latter two specifications mentioned in the specifications list supra, it should be noted that the question of observing certain standards of safety and of nontoxicity for the aqueous silicone dispersions, as well as for the elastomers cross-linked by condensation which are derived therefrom, is posed with some force, because a good number of commercially available products carry or release during cross-linking or drying volatile organic compounds (VOC) which are toxic or aggressive to a greater or lesser degree, such as for example alcohols (ethanol, ethanol, methoxyethanol), ethers, oximes, acids (acetic acid). It is easy to understand why such compounds are undesirable both from the point of view of storage and of use.

In addition to this toxicity/safety aspect, it would be particularly welcome for the final users to have aqueous silicone dispersions and elastomers which generate only water, so as to be able to be used without any special precaution and so as to be also easy to wash with water while retaining good properties of adherence onto supports such as for example glass, wood, concrete and metals.

Various proposals in the prior art have tried, in vain, to satisfy the specifications defined above.

German Patent Application No. 3,019,655 describes a silicone emulsion which, after elimination of water, may be converted to an elastomer under ambient conditions. This silicone emulsion also comprises amorphous silica introduced in the form of a colloidal dispersion. Such silica dispersions are not particularly stable. The pH of the mixture is a critical parameter as regards stability. It is therefore very delicate to set. Moreover, the incorporation of silica is responsible for a degree of inhomogeneity in the hardness of the cross-linked elastomer which can be obtained. This is due to the fact that silica indeed has the tendency to react spuriously with the reactive OH ends of silicone oil.

In other previous proposals, the siliceous filler is sodium silicate (U.S. Pat. No. 4,244,849) or amorphous silica powder (FR No. 2,463,163).

The latter three patents teach that to obtain a storage-stable monocomponent emulsion, its pH should be set at values greater than or equal to 8.5 or 9, preferably equal to 10. However, the emulsions according to these patents do not meet the expectations of the technical field as regards stability, mechanical properties and adherence. Finally, none of the inventions described in these patents simultaneously solves the problem of the VOCs and the problem of adherence, cohesion and stability.

European Patent Application No. 0,359,676 relates to cross-linkable aqueous dispersions which can be used as patty and which comprise a hydroxylated silicone resin as cross-linking agents for an $\alpha,\omega$-(dihydroxy) polydiorganosiloxane oil, the said cross-linking being carried out in the presence of a stannous condensation catalyst. It happens that these emulsified compositions are not adherent to any great extent, in particular to glass. At neutral or acidic pH, their adherence is even zero.

American Patent No. 4,554,187 proposes a silicone emulsion which can be converted to an elastomer under ambient conditions, by eliminating water and alcohol, and comprising a polydiorganosiloxane with hydroxyl ends, a reactive functional alkoxy or acyloxy silicone resin useful as cross-linking agent, a catalyst of the organostannous salt type, thixotropic fillers of a siliceous nature or otherwise and nonthixotropic fillers such as $Ca(OH)_2$. The dry extract of this emulsion is between 20 and 85%. The acyloxy- or alkoxyfunctional cross-linking silicone resin may be a non-amine-containing methyl or methoxysilicone resin or formula $CH_3Si(O)_{1.1}(OCH_3)_{0.8}$. This non-water-soluble resin is introduced in the form of an emulsion. The compositions according to this U.S. patent necessarily contain an anionic surfactant, imposed by the method of preparation of the dihydroxylated silicone oil, by polymerization to an emulsion. Such an anionic surfactant interferes with the stability of the emulsion. It should also be noted that the presence of the cross-linking functionalized acyloxy or alkoxy silicone resin is a factor inhibiting the polymerization in emulsion as long as it is added before the polymerization step. Consequently, this technical proposal is not satisfactory and all the more so since the performance in terms of resilience, elasticity and adherence is weak. Finally, the condensation mechanisms which may occur in this emulsion or this elastomer generate undesirable VOCs (alcohols or acids).

European Patent Application No. 0,572,006 discloses aqueous dispersions of ready-for-use, storage-stable aqueous POS dispersions comprising: a POS (A) having condensable groups (OR—OH) such as α,ω-(diOH-polydimethylsiloxane) (PDMS); a condensation catalyst of the tin salt type; a POS resin (C) containing siloxyl units DT, MT or MQ and having a molecular weight MW≦20,000 (the alkyl substituents of the MDT units being methyls); an adherence promoter (D) containing one or more basic nitrogen-containing residues, and polyvinyl alcohol (E).

The formula for the nitrogen-containing adherence promoter (D) is very general and covers a multitude of compounds. This patent application teaches the use, in a preferential manner, of the promoter (D) of the potassium N-(2-aminoethyl)-3-aminopropylmethylsilanolate type or alternatively of PDMS functionalized with 3-(2-aminoethylamino)propyl units. These recommended adherence promoters (D) are not hydroxylated. Furthermore, the unavoidable presence of polyvinyl alcohol in these aqueous dispersions according to EP-A-0,572,006 is a damaging factor for the coalescence phenomenon which is essential for the cross-linking. This is not without negative repercussions on the mechanical characteristics of the final cross-linked elastomer.

Finally, the aqueous dispersions and the elastomers according to this previous European application do not satisfactorily satisfy the specifications in particular as regards the adherence onto a support and the reduced VOC content. It should be noted that these dispersions according to EP-A-0,572,006 do not contain fillers or comprise fillers which do not generate opacity, with the aim of providing putties capable of giving transparent elastomers in a thin layer.

European Patent Application No. 0,655,475 is in the same vein as EP-0,572,006 cited supra and relates to an aqueous dispersion produced, based on a condensable silicone oil emulsion of the α,ω-diOH PDMS type (A), a POS resin (B) having an MW of less than 20,000 and an amine-containing compound (C), this dispersion being characterized in that it contains no organometallic catalyst.

The compounds (A), (B) and (C) of EP-A-0,655,475 correspond, respectively, to the compounds (A), (C) and (D) of EP-0,572,006.

Here again, the formulas for the cross-linking agent (B) and for the adherence promoter (C) have an extremely broad scope and define very large families of products. In practice, as regards the cross-linking agent (B), this patent application recommends, in particular via these examples, the use of resins with alkoxylated, or even acetoxylated or oximated siloxyl units MD or MDT. It follows that undesirable VOCs will be necessarily present not only in the aqueous silicone dispersion, but especially in the cross-linked elastomer.

As regards adherence promoters (C), the teaching of this patent application urges using potassium silanolates of the potassium N-(2-aminoethyl)-3-aminopropylsilanolate type or alternatively N-(2-aminoethyl)-3-aminopropylmethyl substituted PDMSs. These promoters (C) are not hydroxylated.

Finally, it should be noted that the absence of organometallic catalysts from these compositions according to EP-0,655,475 is damaging to good cross-linking and therefore, in fine, to the mechanical and adherence characteristics of the elastomer.

European Patent Application No. 0,202,494 discloses a process for producing an aqueous silicone emulsion consisting in preparing a base emulsion from:

(A)—100 parts by weight of an α,ω-dihydroxylated polydimethylsiloxane, (B)—1 to 150 parts by weight of a colloidal silica or 0.3 to 30 parts by weight of an alkali metal silicate, (C)—a catalytic quantity of cross-linking catalysts such as dibutyltin dilaurate, (D)—2 to 30 parts by weight of an emulsifier of the sodium lauryl sulphate type, and (E)—water.

The process then consists in adjusting the pH between 9 and 12 and in ensuring that this base emulsion is subjected to age-hardening for 2 weeks at room temperature so as to produce an elastomeric material. The following are then added:

(F)—0.5 to 30 parts by weight of a coupling agent consisting of an epoxyfunctional silane or of the products of hydrolysis or of condensation thereof;

(G)—50 to 300 parts by weight of a filler (carbonate—$TiO_2$), and (H)—0.1 to 2% by weight, relative to the filler, of a dispersant (that of polyphosphate, polyvinyl alcohol PVP and the like).

The emulsion thus obtained may be used to prepare coatings or seals on porous substrates.

It should be noted that this silicone emulsion has the major disadvantage of taking too long to prepare, given the period of age-hardening required.

In addition, the epoxyfunctional silane F as well as its condensation products, but excluding its hydrolysis products, contain hydrolysable organofunctional substituents capable of generating toxic VOCs. Furthermore, it is also possible to criticize this emulsion because it may contain polyvinyl alcohol. It follows therefrom that this emulsion is not satisfactory as regards mechanical (hardening—softness), cohesive and adherence properties for the cross-linked elastomers which are derived therefrom.

French Patent Application No. 94 11 410 relates to an aqueous silicone dispersion which can be cross-linked to an adherent elastomer according to a condensation reaction mechanism. This dispersion comprises a POS (A) of the α,ω-diOH PDMS type, a surfactant (B), a silicon amine-containing compound (C) consisting of several alkoxylated recurring units of formula $R^1_xR^2_y(O^3)_zSiO_{4-(x+y+z)/2}$ with z between 0.2 and 2, $R^1$ and $R^3$=methyl and $R^2$=nitrogen-containing residue. This dispersion also optionally comprises at least one hydroxylated and/or alkoxylated silicone resin (D), and/or at least one alkoxysilane (E), and/or at least one condensation catalyst (F), and/or at least one siliceous or nonsiliceous filler (G).

The silicon and amine-containing compound (C) is a resin whose average functionality in terms of silicone is greater than 2 and capable of being salified at an acidic pH. Such a resin is therefore only water-dispersible or water-soluble at an acidic pH. Such a limitation in the water-solubility is a constraint. In addition, the stability of this emulsion, although satisfactory, can nevertheless still be improved. Finally, this resin (C) is not hydroxylated.

Under these circumstances, one of the essential objectives of the present invention is to provide an aqueous silicone dispersion (emulsion)

capable of cross-linking by elimination of water, preferably under ambient atmospheric conditions, to an elastomer having suitable mechanical properties (cohesion) and endowed with a high power of adhesion to supports of various types (e.g. made of glass, concrete, metal or wood), and which remedies the deficiencies and the disadvantages of known emulsions of this type, especially as regards safety/toxicity (VOC content) and ease of use.

More particularly, the present invention aims to optimize the adherence and cohesion of the elastomers derived from the cross-linking of aqueous silicone dispersions, or to any customary support: glass, concrete, wood, metals (aluminium) and ceramic, without sacrificing the other specifications on the technical specifications list, including in particular the stability in a cartridge for putties (or maximum period of use), elasticity, resilience, hardness, mechanical strength and low cost price, and providing moreover an improvement which aims to reduce as much as possible the VOC content in the dispersion and the elastomer, such that the only solvent or volatile material involved is water.

Another objective of the present invention is to provide an aqueous silicone dispersion and the corresponding cross-linked elastomer which are easy to use and in particular washable with water (cleaning of tools which have served for their preparation and for their use) because of the exclusive presence of water as solvent or continous phase.

Another objective of the present invention is to provide an aqueous silicone dispersion which is stable to storage (cartridge—"pot-life") and which retains reactivity allowing it to cross-link properly and sufficiently rapidly to an elastomer which retains its mechanical properties even after a storage of more than six months.

Another objective of the invention is to provide an aqueous silicone dispersion of the type described above, which leads to an elastomer having improved flame resistance.

Another objective of the invention is to provide an aqueous silicone dispersion which is easy to handle and shape, especially for applications of the type including putty, sealing material, seal, production of film or coating of various types (STC).

Another objective of the invention is to provide a putty, a sealing material, a film or a coating of various type (adherent) such as STC, containing the abovementioned dispersion and/or the cross-linked elastomer which is derived therefrom.

In particular, it would be advantageous to have a dispersion allowing easy production of seals and which offers the possibility of making these seals smooth, so as to give them a nice surface appearance.

In addition, the invention aims to satisfy a need, in the field considered, for a cross-linkable dispersion which can be used for the production of soft elastomeric STCs which are elastic, impermeable to water, permeable to steam and finally which are resistant to abrasion.

These objectives and others are achieved by the present invention which proceeds from the demonstration, after lengthy studies and experiments and quite surprisingly and unexpectedly, of the possibility of eliminating, from aqueous silicone dispersions, the non-hydroxylated condensable constituents as well as the VOCs, as well as the possibility of obtaining a mechanically satisfactory cross-linked elastomer which is strongly adherent to numerous supports, by selecting an adherence promoter which is water-soluble, hydroxylated and carries hydrophilic functional groups for anchoring onto a support.

These features constitue some of the conceptual bases of the invention. Consequently, the present invention relates to an aqueous silicone dispersion which can be cross-linked, by condensation, to an adherent elastomer, characterized:
  in that it comprises constituents which can be condensed, hydroxylated and are free or practically free of hydrolysable organo functional substituents (Sofh), capable of generating VOCs in situ during the hydrolysis and/or during the cross-linking by condensation;
  in that it is free or practically free of volatile organic compounds (VOCs),
  and in that it consists, at least in part, of:
    A—at least one polydiorganosiloxane (POS) having, per molecule, at least two OH groups;
    B—at least one water-soluble adherence and cohesion promoter and chosen from silanes and/or POSs which are hydroxylated and carry, per molecule, at least one hydroxyl group and at least one hydrophilic function for anchoring onto a support (Fas), as well as from mixtures of these products, excluding the products of hydrolysis of alkoxylated epoxyfunctional silanes,
    C—optionally at least one organometallic condensation catalyst, preferably chosen from tin salts,
    D—optionally at least one surfactant,
    E—and optionally at least one cross-linking agent with the conditions according to which:
      * 1 * in the presence of such a cross-linking agent (E), the promoter (B) may only contain at least one OH group per molecule,
      * 2 * while in the absence of such a cross-linking agent (E), the promoter (B) and/or the POS (A) comprises at least three OH groups.

As evident from the above definition of the invention, it is important that the cross-linking function is provided by at least one constituent (A), (B) or (E) for dispersion. This cross-linking function presupposes that at least three OH groups are present per molecule. When one of the constituents (A), (B) and (E) has at least three OH groups, it is not necessary for (A) and/or (E) to satisfy the same conditions. Furthermore, if A and/or B each comprise in less three OH groups, the presence of (E) is optional.

Through these means, the Applicant has had the merit of obtaining aqueous silicone dispersions which can be cross-linked, by condensation, to an elastomer which is highly adherent to numerous supports and, moreover, is free of VOCs and therefore nontoxic and safe. Additionally, the primary aqueous silicone dispersions according to the invention are stable to storage and the corresponding cross-linked elastomers have proved to be paintable, which is not a minor advantage.

For the purposes of the invention, the water-soluble organofunctional substituents (Sofh) which are capable of generating VOCs in situ during cross-linking by condensation are, for example, alkoxy, acetoxy, cetiminoxy and enoxy groups.

Advantageously, the dispersion according to the invention is free or practically free of polyvinyl alcohol (PVA).

More advantageously, the dispersion according to the invention is free or practically free of PVA and necessarily comprises, in addition to the constituents (A) and (B), at least one catalyst (C).

Still more advantageously, the dispersion according to the invention is free or practically free of PVA and necessarily comprises, in addition to the constituents (A), (B) and (C), at least one surfactant (D) and at least one cross-linking agent (E).

In addition to the general characteristics of the presence of hydroxylated condensable constituents (free of Sofh), of absence of VOCs and possibly of PVA, as well as of nonproduction of VOC during the cross-linking, the dispersion according to the invention also finds its novelty in its composition.

The first constituent cited is polyorganosiloxane POS (A), which is the essential constituent from the point of view of the weight. It is advantageously a silicone oil consisting of a polydiorganosiloxane, preferably with hydroxyl ends. The organic groups within the chain of this oil (A) are advantageously selected from the following compounds: hydroxyl, cyclo($C_1$–$C_6$ alkyl) or cyclo($C_1$–$C_6$ alkenyl), (for example vinyl or allyl), and amine. This preferred oil may be represented by the following formula:

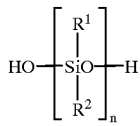

with $n \geq 10$, $R^1$ and $R^2$ identical or different and corresponding to a hydroxyl, a cyclo($C_1$–$C_6$ alkyl) or a cyclo($C_1$–$C_6$ alkenyl)—e.g.: vinyl or alkyl—or alternatively an amine; methyl being particularly preferred.

These organic radicals $R^1$ and $R^2$ may be optionally substituted with cyano or fluoro groups. The substituents generally used because of their availability in industrial products are methyl, ethyl, propyl, phenyl, vinyl and 3,3,3-trifluoropropyl radicals. In general, at least 80%, in numerical terms, of these radicals are methyl radicals.

In practice, α,ω-dihydroxypolydimethylsiloxanes with

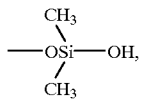

ends are preferred as POS (A).

In the context of the present invention, it is possible to use in particular the α, ω-(dihydroxy)polydiorganosiloxanes prepared by the anionic polymerization process described in the abovementioned American Patents: U.S. Pat. No. 2,891,920 and especially U.S. Pat. No. 3,294,725 (cited as reference). The polymer obtained is anionically stabilized with a surfactant which, in accordance with the teaching of U.S. Pat. No. 3,294,725 is preferably the alkali metals salt of a sulphonic aromatic hydrocarbon acid, the free acid also playing the role of polymerization catalyst. The preferred catalyst and surfactant are dodecylbenzinesulphonic acid or alkylsulphuric acid and their alkali metal salts, in particular their sodium salts. Other anionic or nonionic surfactants may optionally be added. However, this addition is not necessary because, in accordance with the teaching of U.S. Pat. No. 3,294,725, the quantity of anionic surfactant resulting from the neutralization of the sulphonic acid is sufficient to stabilize the polymer emulsion. This quantity is generally less than 3%, preferably 1.5% of the weight of the emulsion.

This process of polymerization in emulsion is particularly advantageous because it makes it possible to directly obtain an emulsion containing the oil (A). Moreover, this process makes it possible to be able to obtain without difficulty α,ω-(dihydroxy)polydiorganosiloxane (A) in an emulsion of very high viscosity.

In accordance with the invention, already polymerized α,ω-(dihydroxy)polydiorganosiloxane (A) will however, be preferably used for the preparation of the dispersion.

This POS (A) may be provided in the form of a single-phase oil or in the form of a preemulsion. The preparation of this preemulsion will be mentioned hereinafter.

It is moreover preferable that the viscosity $\eta$ at 25° C. of these POSs (A) is at least 100 mPa.s, preferably at least 50,000 mPa.s. It is indeed especially for viscosities $\eta$ greater than 50,000 mPa.s that an elastomer is obtained which has a combination of suitable mechanical properties, in particular in terms of hardness shore A and elongation. In addition, the higher the viscosity, the better the mechanical properties are preserved during the age-hardening of the cross-linked elastomer which may be obtained from the aqueous dispersion. The viscosities $\eta$ at 25° C. which are chosen in practice within the context of the invention are between $5 \times 10^4$ and $15 \times 10^5$ mPa.s.

All the viscosities which are referred to in the present disclosure correspond to a so-called "Newtonian" dynamic viscosity parameter at 25° C., that is to say the dynamic viscosity which is measured, in a manner known per se, at a sufficiently low shear rate gradient for the measured viscosity to be independent of the rate gradient.

As regards the adherence promoter (B) selected in accordance with the invention, it should be noted that one of its essential characteristics is having one or more hydroxyl groups, allowing its attachment in the silicone matrix.

Another specificity of the promoters (B) is being equipped with an Fas function(s) bringing about the adherence of the putty (elastomer) derived from the dispersion onto the supports. Finally, the hydrophilic character of the OH groups and/or of the Fas functions of (B) is a preferred and important factor in the invention. This gives (B) an advantageous water-solubility. Indeed, by virtue of this water-solubility, the promoter may be particularly well dispersed and solubilized in the aqueous continuous phase of the dispersion or of the putty (elastomer), so as to promote the stability and the adherence of the said putty onto the supports. This solubilized form of the promoter (B) is an optimum physicochemical form for desired effect. (B) can indeed easily diffuse towards a support/dispersion interface, so as to be able to exert its adherent action, acting against the surfactants present in the dispersions and which are endowed with antagonist effects in this regard. There is competition between the promoter and the surfactants.

For the purposes of the present invention, water-solubility should be understood to mean the capacity of a product to dissolve in water at a temperature of 25° C., in an amount of at least 5% by weight.

The promoter (B) of the dispersion according to the invention may be advantageously chosen from the hydroxylated silanes and/or the Fas-substituted POSs. As examples of hydroxylated and Fas-substituted silanes, there may be mentioned monoFas-trihydroxymonosilanes, such as: $NH_2(CH_2)_3$—$Si(OH)_3$.

Having specified this, the water-soluble adherence promoter (B) is preferably a linear hydroxylated polydiorganosiloxane with siloxyl units D and/or MD and/or a hydroxylated POS resin comprising siloxyl units T and optionally M and/or D and/or Q or alternatively siloxyl units Q and M and/or D and/or T.

This POS is free of VOC and is not substituted with Sofh groups, e.g. with alkoxyl functions. It carries at least one Fas linked to at least one Si.

The siloxyl units M, D, T and Q of the POS (B) are defined as follows:

$-M$ unit = $R_3SiO_{1/2}$ $-D$ unit = $R_2SiO_{2/2}$ $-T$ unit = $RSiO_{3/2}$ $-Q$ unit = $SiO_{4/2}$ The R radicals are identical or different and correspond to a hydrocarbon radical, such as for example an alkyl radical (e.g. methyl, ethyl, isopropyl, tert-butyl and n-hexyl), a hydroxyl radical or an alkenyl radical (e.g. vinyl and allyl) or alternatively an Fas function.

By way of example of a linear hydroxylated POS which can be used as a promoter (B), there may be mentioned PolyMethylSiloxane, in which the two ends contain a hydroxyl and in which each silicon atom carries an Fas function.

The case where the promoter (B) is a water-soluble hydroxylated POS resin is one of the preferred cases according to the invention. The resins which are most particularly selected are those of the T(OH), DT(OH), DQ(OH), DT(OH), MQ(OH), MDT(OH) MDQ(OH) type or mixtures thereof. In these resins, each OH group is carried by a silicon atom belonging to a D, T or Q unit.

These resins are products of condensation (mono- or polycondensation-hetero- or homocondensation) of monomers, oligomers or polymers POS carrying condensable groups, preferably of a hydroxyl nature.

In addition to these hydroxyls, the promoter (B) contains one or more Fas functions which are identical to or different from each other and chosen from the group comprising the functions: amino, epoxy, acrylo, methacrylo, ureido, mercapto, thiol and chloroalkyl.

Preferably, Fas is a nonsalified aminoalkyl group of general formula:

$$-R^3-NR^4R^5 \text{ or } -R^3-NH-R^6-NR^4R^5$$

in which:

$R^3$ and $R^6$=hydrocarbon residue (for example $-(CH_2)_n-$ with n=1 to 10)

$R^4$=H or $-C_nH_{(n+1)}$ $R^5$ has the same meaning as $R_4$ and may be identical or different from $R^4$.

The amine may thus be a primary, secondary or tertiary amine. According to variants, it may be included in a ring or may be included in groups comprising isocyanurates or HALS (piperidine type and the like).

For the purposes of the invention, the HALS gorups may be defined as a cyclic hydrocarbon chain (HALS) of formula:

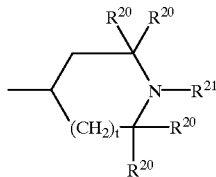

in which:
the $R^{20}$ radicals, which are identical to or different from each other, are chosen from linear or branched alkyl radicals having from 1 to 3 carbon atoms, phenyl and benzyl radicals,
$R^{21}$ is chosen from a hydrogen atom, linear or branched alkyl radicals having from 1 to 12 carbon atoms, alkylcarbonyl radicals where the alkyl residue is a linear or branched residue having from 1 to 18 carbon atoms, phenyl and benzyl radicals and an O radical;
t is a number chosen from 0 and 1;
the preferred $R^{20}$ radicals being methyls, the $R^{21}$ radical being a number of hydrogen or a methyl radical and t being advantageously a number equal to 1.

These Fas functions are advantageously chosen such that they are capable of binding to the support onto which the putty is applied, so as to provide adherence, without adversely affecting the water-solubility which is desirable for the promoter (B). It is the hydroxyl functions which provide, in part, the bridging of the promoter (B) and therefore of the support with the cross-linked silicone elastomer.

According to a variant which can be envisaged, some of the Fas functions may correspond to hydroxyl functions and it should not be excluded that some Fas functions can provide the binding function between the promoter (B) and the silicone matrix (A).

According to a first advantageous embodiment of the invention, the promoter (B) is a water-soluble and hydroxylated silicone resin obtained:

by co-hydrolysis:
of at least one silane $(S_1)$ substituted with Fas groups and with Sofh groups which are identical to or different from each other, preferably $-OR°$ groups with R°=hydrocarbon, advantageously alkyl, radical with at least one silane $(S_2)$ substituted with Sofh groups which are identical to or different from each other and with respect to those of $(S_1)$ excluding Fas substituents;

by heterocondensation of the hydrolysates derived from the silanes $S_1$ and $S_2$, and then by "stripping" or by steam distillation of the hydrolysates derived from the Sofh groups.

Since the most common Sofh groups are $-OR°$ alkoxyls, the mechanisms of heterocondensation involved are of the OH/OH and OH/OR° type, these OH or OR° being carried by hydrolysates derived from silanes $S_1$ and $S_2$. The hydrolysates derived from Sofh groups are for their part alcohols, in this specific case. Thus, in practice, the silane $S_1$ is advantageously a trialkoxysilane, preferably a trimethoxysilane, a triethoxysilane, a methyldimethoxysilene or a methyldiethoxysilane, carrying an amine-containing Fas function of the type:

aminopropyl($H_2N$) $(CH_2)_{-3}$
N-methyl-3-aminopropyl $(H_3CNH)$ $(CH_2)_{-3}$
N-aminoethyl-3-aminopropyl $(H_2N)(CH_2)_2NH(CH_2)_{-3}$
$C_6H_5CH_2NH(CH_2)_2(NH)(CH_2)_{-3}$
3-ureidopropyl: $(H_2N\ CO\ NH)\ (CH_2)_{-3}$
3-4,5-dihydroimidazole-1-ylpropyl:

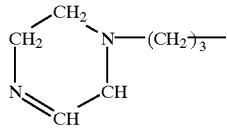

3-methacryloxypropyl: $(H_2C=C)\ (CH_3)\ (COO)\ (CH_2)_{3-}$
3-glycidyloxypropyl:

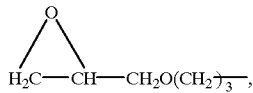

(the other substituents of the Si atoms of the promoter (B) being free of Sofh,
3-mercaptopropyl: (HS) $(CH_2)_{-3}$
3-chloropropyl: (Cl) $(CH_2)_{-3}$
In the case of $S_2$, the Sofh groups which it comprises are preferably alkoxy radicals, advantageously a $C_1$–$C_6$, for example: methoxy, ethoxy or propoxy.

This silane $S_2$, preferably an alkoxysilane, may also contain at least one alkyl substituent, advantageously a $C_1$–$C_6$, for example: methyl, ethyl or propyl.

These resins produced by heterocondensation of $S_1$ and $S_2$ are described in particular in European Patent Application No. 0,675,128, whose content is incorporated by reference into the present disclosure.

According to a second embodiment of the invention, the promoter (B) is a resin obtained:

by hydrolysis of a silane $S_3$ substituted with Fas groups and Sofh groups, by homocondensation of the hydrolysed $S_3$ silanes, and by "stripping" vapour distillation of the hydrolysates derived from the Sofh groups.

The silane $S_3$ is preferably an Fas-substituted alkoxysilane. It may be for example a trialkoxysilane which makes it possible to obtain a hydroxylated resin with T units, also called T(OH) resin.

This silane $S_3$ may be of the same type as the silane $S_1$ as defined supra. The Fas functions substituting $S_3$ correspond to the same definition as that given above.

As illustration of this second embodiment of a promoter (B) of the POS resin type, there may be mentioned that obtained from γ-aminopropyltriethoxysilane hydrolyzed and subjected to "stripping" of the ethanol formed by hydrolysis. The polyhomocondensed resin obtained is a mixture of oligomers containing from 4 to 10 silicon atoms and comprising units:

$$T(OH) = RSi(OH)O_{2/2}$$
$$T = RSiO_{3/2}$$
$$T(OH)_2 = RSi(OH)_2O_{1/2}$$
$$T(OH)_3 = RSi(OH)_3,$$

these units being respectively present in a decreasing quantity and R=NH$_2$—(CH$_2$)$_{-3}$. It is for example an amine-containing T(OH) resin.

One of the essential characteristics of the invention is the absence or near absence of VOC in the dispersion and/or in the cross-linked elastomer which may be obtained from the latter. As a guide, it should be specified that "free or practically free of VOC" is understood to mean a VOC content e.g. less than or equal to 0.5% by weight, in the dispersion, and less than or equal to 10% by weight, preferably 1% by weight, in the promoter (B).

The promoter (B) may be used in the dispersion according to the invention either in the natural form in which it is present in the pure state, or in the form of an aqueous solution, the latter form being preferred.

When it is present, the catalyst (C) is preferably a tin-containing catalytic compound, generally an organotin salt, which is preferably introduced in the form of an aqueous emulsion. The organotin salts which can be used are described in particular in the manual by Noll, Chemistry and Technology of Silicones Academic Press (1968), page 337.

It is also possible to use as tin-containing catalytic compound either distannoxanes or polyorganostannoxanes, or the product of reaction of a tin salt, in particular of a tin dicarboxylate, with ethyl polysilicate, as described in patent U.S. Pat. No. 3,862,919.

The product of the reaction of an alkyl silicate or of an alkyltrialkoxysilane with dibutyltin diacetate as described in Belgian patent BE-A-842 305 may also be suitable.

According to another possibility, a tin II salt, such as SnCl$_2$ or stannous octoate, is used.

The preferred tin salts are tin bischelates (EP-A-147 323 and EP-A-235 049), diorganotin dicarboxylates and in particular dibutyl- or dioctyltin diversatates (British Patent GB-A-1,289,900), dibutyl- or dioctyltin diacetate, dibutyl- or dioctyltin dilaurate or the products of hydrolysis of the abovementioned species (e.g. diorgano and polystannoxanes).

0.01 to 3, preferably 0.05 to 2 parts of organotin salt are used per 100 parts of (A).

According to variants, it is also possible to use as catalyst (C) strong acids or bases (KOH, NaOH) or amines.

When surfactant (D) is used in the dispersion according to the invention, it is preferably a nonionic surfactant. These nonionic surfactants are of course the same as those which may be optionally added to the emulsions (A) obtained by polymerization in emulsion, as indicated above.

In the context of the present invention, anionic surfactants may be optionally added. By way of examples, there may be mentioned the alkali metal salts of sulphonic or alkylsulphuric aromatic hydrocarbon acids and the preferred nonionic surfactants are polyoxyethylenated alkylphenols or polyoxyethylenated fatty alcohols.

The quantity of surfactant which can be used is that commonly used for the preparation of an emulsion as described in particular in the abovementioned patent and in patent U.S. Pat. No. 2,891,920.

The nonionic (in preference), ionic or amphoteric surfactants may be used alone or in the form of a mixture with each other.

The adherence promoter (B) (like POS (A)) may play the role of cross-linking agent alone or in addition to a cross-linking agent (E), preferably consisting of at least one hydroxylated silicone resin having, per molecule, at least two different siloxyl units chosen from those of the M, D, T and Q type, at least one being a T or a Q;

the resins of the MQ, MDQ, TD and MDT type being particularly preferred.

Advantageously, this hydroxylated silicone resin (E) has a hydroxyl group content by weight of between 0.1 and 10% and still more preferably between 1 and 6% by weight.

These silicone resins are well known branched POSs whose preparation processes are described in a very large number of patents. It is possible to use resins which are solid or liquid, preferably liquid, at room temperature. These resins may be incorporated into the aqueous emulsions as such or in solution in an organic solvent or a silicone oil or alternatively in the form of an aqueous emulsion.

Aqueous emulsions of silicone resin which can be used are described for example in Patents U.S. Pat. No. 4,028,339, U.S. Pat. No. 4,052,331, U.S. Pat. No. 4,056,492, U.S. Pat. No. 4,525,502 and U.S. Pat. No. 4,717,599 cited as references.

This optional resin (E) which is cross-linked by condensation is preferably exclusively substituted with condensable functions of the hydroxyl type, excluding hydrolysable organofunctional groups Sofh, e.g. alkoxy, which are capable of generating VOCs after condensation. In addition, this resin (E) is evidently by nature free or practically free of VOC. This means that it comprises less than 10% by weight, preferably less than 1% by weight.

According to variants, the cross-linking agent (E) may also be chosen from the following products: siliconates, silicates, silicas (powdered or colloidal) and mixtures thereof. All these products can be used alone or in the form of a mixture with or may be combined with the hydroxylated resins (E) described supra.

In accordance with an advantageous modality of the invention, the dispersion comprises a siliceous or nonsiliceous filler (F), preferably selected from the following products: precipitated or nonprecipitated silica, colloidal or powdered silica, carbonates and mixtures thereof.

The carbonates, for example of calcium, constitute preferred fillers.

Other examples of fillers (F) which can be used alone or in the form of a mixture are carbon black, titanium dioxide, aluminium oxide, hydrated alumina, expanded or nonexpanded vermiculite, zinc oxide, mica, talc, iron oxide, barium sulphate and calcium hydroxide. These are semireinforcing or packing nonsiliceous inorganic fillers having a particle size which is generally between 1 and 300 μm and a BET surface area of less than 50 m²/g.

The possible siliceous fillers which can be used are of the reinforcing or semireinforcing type. They may be for example colloidal silica, fumed silica powder and precipitated silica or mixtures thereof. Fumed silica is preferred. It is possible, however, to also use semireinforcing siliceous fillers such as diatomaceous earth or ground quartz.

These siliceous powders have a BET specific surface area greater than 50 m²/g, preferably of between 150 and 350 m²/g.

These fillers (F) are introduced into the emulsion in the form of a dry powder or in the form of a colloidal dispersion, for example, by simple mixing.

To the dispersions in accordance with the present invention, there may be added various additives which make it possible to modify their properties and those of the elastomers formed from the said dispersions by eliminating water. It is possible to incorporate for example:

one or more dispersants (G) consisting for example of sodium polyacrylates or sodium hexametaphosphate, one or more plasticizers (H) preferably chosen from nonreactive (blocked) silicone oils and/or from alkylbenzenes, such as those described in KRAFT Patent Application No. 2,446,849.

As other examples of additives, there may be mentioned antifungals (I), antifoams (J), stabilizing or thickening agents (K) such as carboxymethylcellulose or xanthan gum, and bases (L).

In practice and in the case where the intended application is for example putty, the composition of the aqueous silicone dispersion according to the invention is advantageously the following:

(A)—100 parts by weight of an α,ω-diOH polydialkylsiloxane, this oil hanging a viscosity η at 25° C. greater than or equal to 20,000 mPa.s, preferably of between 50,000 and 150,000 mPa.s;

(B)—0.5 to 20, preferably 3 to 15 parts by weight of an aqueous solution, containing at least 5% by weight of dry extract and preferably at least 15% as dry weight, of the adherence promoter (B) formed by an Fas-substituted, hydroxylated POS resin, excluding any hydrolysable organofunctional substitution (e.g. alkoxy), and free of VOC, this POS resin titrating between 0.5 and 40% by weight of OH and between 10 and 50% by weight of Fas, (C)—0 to 3, preferably 0.05 to 0.5 parts by weight of condensation catalyst (C), preferably one or more tin salts, (D)—0.5 to 10, preferably 2 to 8 parts by weight of surfactant (D), chosen from ionic, amphoteric or nonionic surfactants, the latter being preferred (e.g. polyoxyalkylenated alcohol);

(E)—0 to 20, preferably 0.5 to 10 parts by weight of at least one hydroxylated silicone resin (E) as defined above, preferably a hydroxylated MDT resin and in which the alkyl substituents=$CH_3$, with η at 25° C. between 100,000 and 200,000 mPa.s, (F)—0 to 250, preferably 0 to 200 parts by weight of filler, preferably of nonsiliceous filler, (G)—0 to 5, preferably 0 to 3 parts by weight of dispersant.

When the dispersion according to the invention is more particularly—but not limitatively—intended to constitute a paint or a semi-thick coating (STC), its composition is advantageously the following:

(A)—100 parts by weight of an α,ω-diOH polydialkylsiloxane, this oil having a viscosity η at 25° C. greater than or equal to 20,000 mPa.s, preferably of between 50,000 and 150,000 mPa.s;

(B)—0.5 to 20, preferably 2 to 15 parts by weight of an aqueous solution, containing at least 5% by weight of dry extract and preferably at least 15% as dry weight, of the adherence promoter (B) formed by an Fas-substituted, hydroxylated POS resin, excluding any hydrolysable organofunctional substitution (e.g. alkoxy), and free of VOC, this POS resin titrating between 0.5 and 40% by weight of OH and between 10 and 50% by weight of Fas, (C)—0 to 5, preferably 0.05 to 4.5 parts by weight of condensation catalyst (C), preferably one or more tin salts, (D)—0.5 to 10, preferably 2 to 8 parts by weight of surfactant (D), chosen from ionic, amphoteric or nonionic surfactants, the latter being preferred (e.g. polyoxyalkylenated alcohol);

(E)—0 to 20, preferably 0.5 to 10 parts by weight of at least one hydroxylated silicone resin (E) as defined above, preferably a hydroxylated DT and/or MDT resin and in which the alkyl substituents=$CH_3$, with η at 25° C. between 100,000 and 200,000 mPa.s;

(F)—0 to 250, preferably 0 to 200 parts by weight of filler, preferably of nonsiliceous filler;

(G)—0 to 5, preferably 0 to 3 parts by weight of dispersant;

(H)—0 to 20, preferably 0 to 10 parts by weight of plasticizer;

(I)—0.05 to 5, preferably 0.1 to 1 of antifungal;

(J)—0.05 to 5, preferably 0.1 to 1 parts by weight of antifoam;

(K)—0 to 250, preferably 0 to 200 parts by weight of stabilizer/thickener (e.g. xanthan gum);

(L)—0 to 10, preferably 0 to 5 parts by weight of base.

The aqueous dispersion according to the invention is provided as a two-phase emulsion in which the continuous phase consists of water and in which the discontinuous phase comprises, in particular, the polydiorganosiloxane silicone oil (A).

In the case of putties, the preparation of this aqueous silicone disperson may, for example, be carried out in the following manner:

a) preparation of a mixture consisting of:
of at least one viscous α,ω-dihydroxylated silicone oil (A) (η>20,000 mPa.s)
optionally a hydroxylated silicone resin (E)
optionally a filler (F)
optionally a condensation catalyst (C) (tin salt and the like), b) emulsification of the mixture a) with the aid of nonionic (preferably) or ionic surfactants (D), (optionally in the form of a mixture) in the presence of an optimum quantity of water; mixing of this mixture until a fine silicone/water emulsion is obtained (having a mean particle size of less than $5\mu$ and preferably less than $1\mu$, c) dilution with water so as to adjust the dry extract of the final putty to the desired value (greater than 50% and preferably greater than 70%)

d) optional adjustment of the pH of the emulsion to a value which makes it possible to facilitate the solubilization of the carboxylated or amine-containing silicone resin in the aqueous phase of the putty during its incorporation into the mixture, (acidic, neutral or basic pH), e) optional addition of dispersant (G), f) incorporation of a silicone resin (B) (or oligomer), preferably in aqueous solution, this resin being soluble in water ($\geqq 5\%$ and preferably >10%) at the pH of the putty g) optional incorporation of reinforcing fillers (F) (for example $CaCO_3$ or silica)

h) optional introduction of an additional cross-linking agent (E) (alkylsiliconate, alkali metal silicate, colloidal silica and the like) and/or of a condensation catalyst (for example tin or titanium salt) optionally in the form of an aqueous emulsion.

According to one variant, the silicone oil (A) of step a) is replaced with at least one preemulsion of $\alpha,\omega$-dihydroxylated silicone oil (A) obtained by polymerization in emulsion of linear and/or cyclic oligomers of very low viscosity $\eta$ at 25° C. (<1000 mpa.s) according to known techniques which are mentioned above.

In practice, the process for the emulsification of the silicone phase (step b) may be for example that described in Application WO-A-94/09 058.

For the putty application, the aqueous silicone dispersion which can be cross-linked to an adherent elastomer is a filler-containing oil-in-water emulsion whose dry extract is greater than or equal to 50% by weight, preferably to 80% by weight and still more preferably of between 85% and 95% by weight.

In the case of STCs, the preparation of the dispersion may e.g. be carried out in the following manner:

a'— preparation of an emulsion comprising:
    oil(s) (A)
    adherence promoter(s) (B)
    surfactant(s) (D)
    silicone resin(s) (E)
    water;

b'—mixing of the emulsion a' of at least one of the following compounds:
    filler(s) (F)
    dispersant(s) (G)
    antifungal(s) (I)
    antifoam(s) (J)
    thickener(s) (K)
    catalyst (C)
    base(s) (L).

Naturally, the preparation sequence may be b'a' instead of a'b'.

For the application as paint which can be cross-linked to a thin film STC, the aqueous dispersion according to the invention is formulated such that its dry extract is between 30 and 70% by weight, preferably of the order of 40%.

As is evident from the preceding text, the dispersions according to the invention are more particularly appropriate in the building industry, for the production of putties, packing and sealing materials such as seals or alternatively for preparing films, paints, coatings (STC) or other thin layers.

The subject of the invention is also all the finished products including in particular putties, sealing materials, films, coatings (STC), paints comprising the dispersion and/or the cross-linked elastomer obtained from this dispersion.

Another subject of the invention is the use of the product (B) as defined supra as water-soluble cohesion and adherence promoter (B), in an aqueous silicone dispersion which can be cross-linked to an adherent elastomer by condensation and comprising:

(A)—at least one POS having, per molecule, at least two condensable groups, preferably OH;

(C) optionally at least one condensation catalyst;

(D)—optionally at least one surfactant;

(E)—optionally one cross-linking agent consisting of at least one hydroxylated silicone resin having, per molecule, at least two different siloxyl units chosen from those of the M, D, T and Q type; one of the units being T or Q;

(F)—optionally one siliceous or nonsiliceous filler;

(G)—optionally one or more dispersants (G);

(H)—optionally one or more plasticizers (H);

(I)—optionally one or more antifungals (I);

(J)—optionally one or more antifoams (J);

(K)—optionally one or more stabilizers or thickeners (K);

(L)—optionally one or more bases (L).

The dispersions according to the invention are in reality precursor systems for cross-linked products (elastomers), these precursors are provided in monocomponent form which can be cross-linked by elimination of water, for example by virtue of the drying resulting from placing under ambient conditions.

The preferred precursor system according to the invention is of the monocomponent type. In such a specific case, the fillers (F) are necessary for the stability of the system.

However, it may also be pluricomponent, for example bicomponent, which can be cross-linked by mixing the components just before application.

A bicomponent system consists of two distinct parts P1 and P2 which are intended to be mixed in order to form the dispersion, one of these parts P1 and P2 containing the oil (A) and the other the cross-linking agent, the catalyst (C) being optionally present in only one of the parts P1 and P2.

These precursor systems constitute other objectives which fit perfectly in the context of the present invention.

The dispersions according to the invention have the great advantage of being stable, easy to handle and to use, and of leading to cross-linked elastomers endowed with excellent mechanical properties: hardness, rupture strength, elongation at rupture, modulus of elasticity, resilience, elasticity and softness, this being both immediately after they are produced and after age-hardening. These mechanical properties can be adapted to the intended application.

Moreover, these cross-linked elastomers have to their credit a low cost price, good flame resistance, a satisfactory thixotropy and a short cross-linking time. Finally, and in particular, these cross-linked elastomers have, as major quality, their good adherence to customary supports such as glass, wood, metals or other ceramic materials while having a low VOC content. Their aqueous nature, exclusive of VOC, offers great ease of use, in particular the possibility of washing the putty or the STC with water once it has been cross-linked after application.

Finally, particularly advantageous properties for the STCs derived from this dispersion, namely impermeability to water, permeability to steam and resistance to abrasion, should be underlined.

This offers many outlets for the invention in the field of putties, sealing materials, materials for forming films, paints, coatings which can be cross-linked to thin films STC and the like.

The examples which follow will make it possible to understand the invention more clearly and to understand all its advantages as well as its variant embodiments.

EXAMPLES

Example 1

Putty 1.1. Preparation of the Concentrated Emulsion in an IKAVISK Reactor:

The following are introduced, in order, into a 1.5 liter IKAVISK glass reactor equipped with a scraping blade driven by a Stöber motor:

- (A)—580 g of α,ω-dihydroxylated silicone oil, of viscosity=135,000 mpa.s, of Mw=about 140,000, and titrating about 300 ppm of OH,
- (E)—11.6 g of MDT resin hydroxylated before 0.5% of OH by weight and consisting of 62% by weight of $CH_3SiO_{3/2}$ units, 24% by weight of $(CH_3)_2SiO_{2/2}$ units and 14% by weight of $(CH_3)_3SiO_{1/2}$ units,
- (D)—34.8 g of Génapol X080 from the company HOECHST, which is a polyoxyethylenated isotridecyl alcohol (containing 8 EO on average), 29 g of demineralized water.

The mixture is subjected to cooling, by circulating with cold water in the base of the IKA reactor, then the mixture is stirred at 100 revolutions/min for 1 hour and 50 minutes. The temperature at the end of the mixing reaches 26.5° C. A concentrated emulsion of silicone oil in water is thus obtained which has the consistency of a gel, whose particle size, characterized with a COULTER LS130 (from the company COULTRONICS) has a mean value of 0.39 μm.

1.2 Formulation of the Putty:

The stirring speed is reduced to 70 revolutions/min.

The mixture is gradually diluted by introducing, with stirring, 135 g of demineralized water.

The following are then gradually introduced (over 10 minutes) and with stirring:

- (G)—13.9 g of Coatex P50 (sodium polyacrylate from the company COATEX),
- (B)—29 g of aqueous solution of resin (B), a solution marketed by the company HULS under the name DYNASYLAN HS 2776; it is an aqueous solution at 2.56 mol/l (expressed as silicon) of an organofunctional siloxane oligomer, free of alcohol and of residual alkoxy groups, which is obtained by cohydrolysis of DYNASYLAN DAMO (aminoethylaminopropyltriethoxysilane) and of DYNASYLAN MTES (methyltriethoxysilane), followed by stripping of the ethanol; the aqueous solution has a dry extract of 30% by weight (measured on 2 g of solution devolatilized for 15 min at 120° C.,
- (F)—290 g of carbonate Socal 312 (from Solvay),
- (F)—290 g of carbonate BLR3 (from OMYA),
- (C)—2.9 g of catalytic aqueous emulsion containing 37.6% by weight of dioctyltin dilaurate.

The putty is degassed under vacuum (40 mm Hg) and with stirring (5 min), and packaged in airtight polyethylene cartridges of 300 ml.

The pH of the putty is equal to 10.5

Example 2

Putty

Example 1 is repeated, the only differences being:

the resin (E) dose is reduced to 5.8 g, and the 29 g of DYNASYLAN HS 2776 from HULS are replaced with 47 g of DYNASYLAN 2759 from HULS, which is also an aqueous solution of organo-functional siloxane oligomer, free of alcohol and of residual alkoxy groups, but whose organic residues contain epoxyglycol (non-amine-containing product) having a dry extract of 37% by weight (measured on 2 g of solution devolatilized for 15 min at 120° C.).

Example 3

Putty

Example 1 is repeated, the only differences being:

the resin (E) 4509 dose is reduced to 5.8 g, and the 29 g of DYNASYLAN HS 2776 from HULS are replaced with 36.7 g of DYNASYLAN 2908 from HULS, which is also an aqueous solution of an organofunctional siloxane oligomer, free of alcohol and of residual alkoxy groups, but whose organic residues contain ureidoalkyl, having a dry extract of 24% by weight (measured on 2 g of solution devolatilized for 15 min at 120° C.).

Example 4

Putty 4.1. Use of the Amine-Containing Water-Soluble Resin (B)

Resin B: It is an aqueous solution of amine-containing resin T(OH) prepared by preparing an aqueous solution containing 40% of gamma-aminopropyltrimethoxysilane and then stripping the ethanol formed by hydrolysis; the solution is perfectly clear and has a dry extract of 23%. It is a mixture of oligomers containing from 4 to 10 silicon atoms and having an $NH_2$ content of 2.9% (+/−0.3%). Its viscosity at 25° C. is 4 cst (+/−1 cst). Characterization by NMR: the ethoxy groups and the ethanol are no longer detectable (by 1H NMR 360 Mhz in CD3OD, or by GC); the molar distribution (in mol % Si) determined by 29 Si NMR at 59 Mhz (in DMSO, ref=TMS) is the following:

| units | T(OH)3 | T-OH)2 | TOH | T |
|---|---|---|---|---|
| chemical shifts (ppm) | −42.3 | −51 | 58/−59 | −65/−68 |
| mol % Si | 4.0 | 16.9 | 46.2 | 32.9 |

4.2. Example 1 is repeated, replacing the resin B used with the resin B according to 4.1., and replacing the nonionic surfactant with sodium lauryl sulphate (44.8 g) and doing the emulsification in the presence of 39.2 g of water.

Example 5

Putty

Example 1 is repeated without using a cross-linking agent (E) and replacing the 29 g of DYNASYLAN HS 2776 with 75.4 g of solution of resin B according to 4.1.

Comparative Example 6

Putty

Example 1 is repeated using 40.6 g of resin (E) as defined in Example 1, but omitting the solution of resin (B).

Example 7

Putty

Example 4.1. is repeated but omitting the catalyst (C).

Methods of Evaluation

Initial Mechanical Properties:

24 hours after preparation of the putty, the dispersion is spread with a calibrated scraper in order to produce a film 2 mm thick which is allowed to dry for 10 days before measuring the following mechanical properties:

- Shore A hardness (DUR) according to the ASTM-D-2240 standard
- rupture strength (R/R) according to the AFNOR-T 46 002 standard corresponding to ASTM-D 412, in Mpa,
- elongation at rupture (A/R) in % according to AFNOR-T 46 002,
- elastic modulus Mod100 at 100% elongation according to the AFNOR-T 46 002 standard, in MPa.

Mechanical Properties After Accelerated Age-Hardening:

The preceding mechanical measurements are repeated on a putty stored in a sealed cartridge for 14 days at 50° C.

Adherence: Qualitative Measurement:

24 hours after preparation of the putty, it is deposited in the form of a string 2 to 3 mm thick on a support made of clear glass, wood, aluminium or concrete. After drying these test pieces for 14 days, the level of adherence is evaluated by creating, with a cutter blade, an incipient rupture at the interface between the dry putty and the support, and then trying to propagate this rupture by peeling. The adherence is considered:

- excellent (marked +++) when the string cannot be detached from its support
- good (marked ++) when the string is detached with difficulty and in small surface areas
- poor (marked +) when the string is detached quite easily, even if a few points of anchorage remain at the periphery
- zero (marked 0) when the string is detached without difficulty The mode of rupture, which may be predominantly adhesive "RA" (at the putty/support interface) or cohesive "RC" (within the putty), is also evaluated. Quantitative Measurement:

An adhesive bonding test piece is prepared by trapping a parallelepiped of putty (12×6×50 mm) between 2 test pieces made of glass and of concrete (putty/support interface=50×6 mm) and antiadherent spacers made of Teflon. A putty/air interface of 50×12 mm is left free so as to allow drying of the putty.

The total duration of drying is 28 days, but the spacers are removed from the assembly after a few days so as to facilitate the drying. The test piece, which has been dried for 28 days, is removed from the dynamometer, the tensile curve thus obtained making it possible to determine the elongation and the force (or modulus) corresponding to the rupture of the support/putty/support (sandwich) complex. The mode of rupture, which may be adhesive (at the putty/support interface) or cohesive (within the putty), is examined.

RESULTS - SUMMARY TABLE

| Examples | 1 | 2 | 3 | 4 | 5 | Comparative Example 6 | 7 |
|---|---|---|---|---|---|---|---|
| Particle size of the emulsion (μm) | 0.39 | 0.37 | 0.37 | 0.94 | 0.37 | 0.94 | 0.39 |
| pH of the putty | 10 | 9.5 | 9.5 | 10.5 | 10.5 | 9 | 10.5 |
| Properties of the 2 mm film | | | | | | | |
| Hardness (Shores A) | 35 | 0 | 8 | 36 | 0 | 22.5 | 1 |
| Rupture strength (MPa) | 1.23 | NM | 0.64 | 1.03 | NM | 0.72 | NM |
| Elongation Rupture (%) | 440 | NM | 1145 | 200 | NM | 576 | NM |
| Modulus 100% (MPa) | 0.73 | NM | 0.16 | 0.85 | NM | 0.32 | NM |
| Qualitative adherence to glass | RC | RA(0) | RC | RC | NM | RA(0) | NM |
| Qualitative adherence to concrete | RA(++) | RA(+) | RC | RA(++) | NM | RA(0) | NM |
| Qualitative adherence to aluminum | RA(++) | RA(0) | RC | RA(++) | NM | RA(0) | NM |
| Qualitative adherence to wood | RC | RA(0) | RA(0) | RC | NM | RA(0) | NM |
| Properties after 14 days at 50° C. | | | | | | | |
| Hardness (Shores A) | 31 | 10.5 | 20 | 41 | 11 | 28 | 9 |
| Rupture strength (MPa) | 1.08 | 1 | 0.98 | 1.22 | 0.5 | 0.72 | 0.41 |
| Elongation Rupture (%) | 442 | 1137 | 703 | 292 | 644 | 343 | 760 |
| Modulus 100% (MPa) | 0.6 | 0.18 | 0.38 | 0.9 | 0.23 | 0.4 | 0.19 |
| Qualitative adherence to glass | ++ | | | | +++ | 0 | — |
| Quantitative adherence (fresh putty) to glass: | | | | | | | |
| Rupture strength (MPa) | 0.66 | 0.05 | 0.46 | — | 0.17 | NM | 0.06 |

| Examples | 1 | 2 | 3 | 4 | 5 | Comparative Example 6 | 7 |
|---|---|---|---|---|---|---|---|
| Elongation at rupture (%) | 160 | 5 | 370 | — | 500 | NM | 160 |
| Type of rupture to concrete: | RC | RA | RA | — | RA | RA | RA |
| Rupture strength (MPa) | 0.45 | 0.17 | 0.21 | — | — | NM | — |
| Elongation at rupture | 60 | 40 | 60 | — | — | NM | — |

-continued

| Examples | 1 | 2 | 3 | 4 | 5 | Comparative Example 6 | 7 |
|---|---|---|---|---|---|---|---|
| Rupture type to aluminium: | RA | RA | RA | — | — | — | — |
| Rupture strength (mPa) | 0.6 | 0.12 | 0.48 | — | 0.04 | — | — |
| Elongation rupture (%) | 180 | 20 | 560 | — | 40 | — | — |
| Rupture type | RC | RA | RC | — | RA | — | — |

RA = adhesive rupture;
RC = cohesive rupture;
NM = not measurable

Example 8

Semi-Thick Coating (STC)

8.1. Preparation of a Colloidal Dispersion of Fillers and Other Additives Intended to be Included in the STC Precursor Dispersion.

The following are introduced in order into a 1.5 liter IKAVISK glass reactor equipped with a scraping blade driven by a STÖBER motor:

47.8 g of distilled water (K)—163.0 g of solution of stabilizer consisting of a RHODOPOL solution (xanthan gum=large molecule consisting of a cyclic sugar and acid—mw2×10$^6$) at 1% in distilled water, marketed by the company RHONE POULENC.

(G)—9.28 g of dispersant COATEX P50 (sodium polyacrylate), (I)—1.17 g of antifungals TPI 12-15 (solution of isotiazolinone derivatives in a glycol, marketed by the company PHAGOGENE), (J)—1.02 g of antifoam BEVALOïD 6001 consisting of an aqueous emulsion of a mixture of metallic soap and of mild nonionic surfactant, in a highly refined hydrocarbon oil; this antifoam being marketed by the company RHONE POULENC.

This mixture is stirred at 100 rpm and then cooling and increasingly vigorous stirring are gradually introduced:

(F)—44.7 g of filler consisting of titanium dioxide RL 60 obtained from the company RHONE POULENC, (F)—44.7 g of filler consisting of TIXOLEX 17 (sodium silicoaluminate marketed by RHONE POULENC), (F)—402.1 g of filler, carbonate BLP2, marketed by the company OMYA.

After the addition of the above fillers (F), the stirring speed is about 600 rpm and the temperature is 30° C. This stirring is maintained for 30 min.

8.2 Preparation of the Aqueous Silicone Dispersion, Precursor of an STC

An aqueous silicone emulsion prepared as indicated above is introduced into the colloidal dispersion, with stirring:

the following are introduced in order into a 1.5 l IKAVISK glass reactor equipped with a scraping blade driven by a STÖBER motor:

(A)—387 g of α,ω-dihydroxylated silicone oil, of viscosity=80,000 mPa.s, of $M_w$ equal to about 100,000 and titrating about 350 ppm of OH, (E)—19 g of resin (E) comprising DT units and hydroxylated at the rate of 2.2% of OH, $CH_3SiO_{3/2}$ units being present in an amount of 70% by weight whereas the $(CH_3)_2SiO_{2/2}$ units represent 30% by weight; this resin having a molecular mass of about 1300 and a $CH_3Si$ molar ratio=1.77;

(D)—23.2 g of surfactants GENAPOL×0.80 (polyoxyethylenated isotridecyl alcohol) containing 8 EO on average, marketed by the company EUXT; 19.3 g of demineralized water.

The reactor is cooled by circulating cold water in its base. The stirring carried out is 100 rpm for 1 h 50 min. The temperature at the end of the mixing is of the order of 26° C. A concentrated emulsion of silicone oil in water is thus obtained. This emulsion has the consistency of a gel. The stirring is reduced to 70 rpm. The mixture is gradually diluted by introducing, with stirring, 228.4 g of demineralized water. A milky emulsion is thus obtained whose particle size, characterized with a COULTER LS 130, has a mean value of 0.5 μm.

After introducing this milky emulsion into the colloidal dispersion prepared according to 8.1, the following are then gradually added, with stirring:

(C)—6.82 g of catalytic aqueous emulsion containing 37.6% of dioctyltin dilaurate;

(B)—20.3 g of amine-containing water-soluble resin of the same type as that used in Example 4.1 described supra;

(L)—13.0 g of 20% aqueous potassium hydroxide. The STC thus produced is degassed under vacuum (40 mm Hg) and with stirring (5 min).

The composition of the emulsion obtained is the following (expressed in parts by weight):

| | | |
|---|---|---|
| Water | | 12.36 |
| (K) | Rhodopol 50 MD at 1% | 42.11 |
| (G) | Coatex P50 | 2.40 |
| (I) | TPI 12.15 | 0.30 |
| (J) | Bévaloïd 600 | 0.26 |
| (F) | TiO$_2$ (RL 60) | 11.54 |
| (F) | Tixolex 17 | 11.54 |
| (F) | CaCO$_3$BLP2 | 103.90 |
| (A) | α,ω dihydroxylated oil | 100.00 |
| (E) | Hydroxylated DT resin | 5.00 |
| (D) | Genapol x 080 | 6.00 |
| Water | | 64.00 |
| (C) | Catalytic emulsion of dioctyltin dilaurate | 1.76 |
| (B) | Water-soluble amine resin | 5.25 |
| (L) | 20% aqueous potassium hydroxide | 3.37 |

Comparative Example 9

STC

The example is carried out as in Example 8 replacing 50% of the aqueous silicone emulsion used in 8.2 with a UV-cross-linkable styrene-acrylic latex of the Rhodopas DEA 1022 type marketed by RHONE POULENC

Example 10

STC 10.1 Preparation of the Aqueous Silicone Dispersion

Example 8.2 is repeated, the only differences being that:

32.9 g of the hydroxylated MDT resin comprising 0.5% of OH by weight and consisting of 62% by weight of $CH_3SiO_{3/2}$ units, 24% by weight of $(CH_3)_2SiO_{3/2}$ units and 14% by weight of $(CH_3)_3SiO_{1/2}$ units, are used as resin (E).

the gel is diluted not with 228.4 g of demineralized water but 237.3 g.

This aqueous silicone dispersion is mixed with (C)—6.99 g of catalytic emulsion of dioctyltin dilaurate and (B)—11.61 g of amine-containing water-soluble resin of the same type as that used in Example 4.1. described supra.

This preparation is allowed to age for 2 days at 23° C. before preparing the STC.

10.2 The colloidal dispersion is prepared as in 8.1.

10.3. Preparation of the STC the STC is prepared by gradually introducing, with stirring, into the colloidal dispersion:

premix (consisting of the silicone emulsion, the catalytic emulsion C and the water-soluble resin (B)).

12.7 g of 20% aqueous ammonium hydroxide solution.

The STC thus obtained is degassed under vacuum (40 mm Hg) and with stirring (5 min).

The composition of the emulsion obtained is the following (expressed in parts by weight):

| Water | | 12.36 |
|---|---|---|
| (K) | Rhadopol 50 MD at 1% | 42.11 |
| (G) | Coatex P50 | 2.40 |
| (I) | TPI 12.15 | 0.30 |
| (J) | Bévaloïd 600 | 0.26 |
| (F) | $TiO_2$ (RL 60) | 11.54 |
| (F) | Tixolex 17 | 11.54 |
| (F) | $CaCO_3$ BLP2 | 103.90 |
| (A) | α,ω dihydroxylated oil | 100.00 |
| (E) | Hydroxylated MDT resin | 8.50 |
| (D) | Genapol x 080 | 6.00 |
| Water | (5 + 61.3) | 66.30 |
| (C) | Catalytic emulsion of dioctyltin dilaurate | 1.81 |
| (B) | Water-soluble amine resin | 3.00 |
| (L) | 20% aqueous potassium hydroxide | 3.14 |

Example 11

Evaluation of the Properties of the STCs of Examples 8, 9 Comp and 10

11.1 Methods of Evaluation

Permeability of Steam (Sd)

According to the EN 1062-2 standard.

On an STC film of about 180 μm dry after an accelerated drying of 24 h at 23° C. and 50% RH and then 24 h at 50° C. in an oven; ageing of 3 cycles of soaking in water 8 h at 23° C./drying 16 h at 50° C.; ending with reconditioning for 3 days at 23° C. and 50% RH.

Absorption of Liquid Water (W)

According to the DIN 52617 standard.

Test carried out on a film of about 180 μm deposited on plasterboard dried 24 h at 23° C. and then 24 h at 50° C. Conditioning 3 days at 23° C. and 50% RH.

Measurements carried out after 3 washes by absorption of water for 24 h separated by drying at 40° C.

Reconditioning 7 days at 23° C. and 50% RH.

Result: water absorbed in 24 h per $m^2$ of STC.

Elongation at Rupture

According to the AFNOR - T46002 standard.

Test carried out on a dynamometer with a test piece H2 of about 1 mm thick, drawn out at 50 mm/min; after drying for 28 days at 23° C. and 50% relative humidity.

Wet Abrasion

According to the AFNOR No. 300 82 standard.

Test carried out on a Doitteau plynometer On a dry film of about 180 μm deposited on asbestos cement having undergone an accelerated drying of:

4 d at 23° C. - 50% RH and then 9 d at 50° C.

Reconditioned 24 h minimum at 23° C. - 50% RH.

The result is expressed in number of brush strokes necessary to obtain a wear of 50% of the coating.

Specular Brilliance

According to the NF T 30 064 standard

Measurement of the reflection or of the diffusion of a light beam under 85° C., carried out with a Glossmaster 507 m. The current produced proportional to the light intensity is indicative of the state of brilliancy.

11.2 Results

| Examples | 8* | 9 comp | 10 |
|---|---|---|---|
| Sd: steam permeability (m) after ageing by washes | 0.28 | 0.46 | 0.30 |
| cu: absorption of liquid water (kg/$m^2$ √h) | <0.1 | <0.1 | — |
| Elongation at rupture (%) | 200 | >200 | 300 |
| Wet abrasion (number of strokes) | 10,000 | — | >10,000 |
| Specular brilliance | about 4 | about 10 | — |

*the results of Example 8 are unchanged without potassium hydroxide.

What is claimed is:

1. An aqueous silicone dispersion having a volatile organic compounds content of less than or equal to 0.5% by weight, which can be cross-linked, by condensation, to an adherent elastomer, comprising, condensable hydroxylated constituents free of hydrolysable organo functional substituents, capable of generating volatile organic compounds in situ during the hydrolysis or during the cross-linking by condensation;

said dispersion comprising:

A—at least one polydiorganosiloxane having, per molecule, at least two OH groups;

B—at least one water-soluble adherence promoter being a silane or a polyorganosiloxane which is hydroxylated and carry, per molecule, at least one hydroxyl group and at least one hydrophilic function for anchoring onto a support, hereafter referred to as Fas, being identical to or different from each other and selected from the group consisting of amino, acrylo, methacrylo, ureido, mercapto, thiol, and chloroalkyl, the silane being monoFas-trihydroxy-monosilane, the polyorganosiloxane being obtained by one of the two following processes:

process 1:

a) co-hydrolysis of at least one silane $S_1$ substituted with Fas groups and with at least a —OR group wherein R is an hydrocarbon group which are identical to or different, and of at least one silane $S_2$ substituted with —OR groups which are identical to or different, excluding Fas substituents, to obtain hydrolysates, b) heterocondensation of the hydrolysates derived from the silanes $S_1$ and $S_2$, c) and then stripping or steam distillation of the hydrolysates derived from the —OR groups, process 2:

aa) hydrolysis of a silane $S_3$ substituted with Fas groups and —OR groups, to obtain hydrolysed $S_3$ silanes and hydrolysates derived from the —OR groups, bb) homocondensation of the hydrolysed $S_3$ silanes, cc) and by "stripping" vapour distillation of the hydrolysates derived from the —OR groups, the products of hydrolysis of alkoxylated epoxyfunctional silanes being excluded, C—optionally, at least one organometallic condensation catalyst, D—optionally, at least one surfactant, E—and, optionally, at least one cross-linking agent with the proviso that:

in the presence of the cross-linking agent (E), the promoter (B) only contains at least one OH group per molecule, and in the absence of the cross-linking agent (B), the promoter (B) or the POS (A) comprises at least three OH groups.

2. A dispersion according to claim 1, free of polyvinyl alcohol.

3. A dispersion according to claim 2, further comprising, in addition to the constituents (A) and (B), at least one catalyst (C).

4. A dispersion according to claim 1, free of polyvinyl alcohol and comprising, in addition to the constituents (A), (B) and (C), at least one surfactant (D) and at least one cross-linking agent (E).

5. A dispersion according to claim 1, wherein the polyorganosiloxane (A) is an oil of formula:

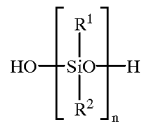

wherein $n \geq 10$, $R^1$ and $R^2$ identical or different are hydroxyl, a cyclo($C_1$–$C_6$ alkyl), a cyclo($C_1$–$C_6$ alkenyl), methyl, ethyl, propyl, phenyl, vinyl, 3,3,3,-trifluoropropyl, or amine.

6. A dispersion according to claim 5, wherein $R^1$ and $R^2$ are methyl.

7. A dispersion according to claim 1, wherein the water-soluble adherence promoter (B) is a linear hydroxylated polydiorganosiloxane with siloxyl units D or MD, or a hydroxylated polydiorganosiloxane resin comprising siloxyl units T and optionally M, D, Q or alternatively siloxyl units Q and M, D, or T, the promoter is free of volatile organic compounds and is not substituted with hydrolysable organo functional groups, and said promoter carries at least one function for anchoring onto a support linked to at least one silicon atom.

8. A dispersion according to claim 7, wherein the promoter (B) is a resin selected from the group consisting of T(OH), DT(OH), DQ(OH), DT(OH), MQ(OH), MDT(OH), and MDQ(OH).

9. A dispersion according to claim 1, wherein no crosslinking agent is present or said dispersion further comprises a cross-linking agent (E) comprising:

at least one hydroxylated resin having, per molecule, at least two different siloxyl units selected from the group consisting of M, D, T and Q ; at least one being a T or a Q; or at least one siliconate, one silicate, powdered silicas, or colloidal silicas.

10. A dispersion according to claim 9, wherein the resin is a resin MQ, MDQ, TD or MDT.

11. A dispersion according to claim 1, further comprising a siliceous or nonsiliceous filler (F).

12. A dispersion according to claim 11, wherein said filler is a precipitated silica, a non precipitated silica, a colloidal silica, a powdered silica, or a carbonate.

13. A dispersion according to claim 11, further comprising one or more dispersants (G).

14. A dispersion according to claim 13, further comprising one or more plasticizers (H).

15. A dispersion according to claim 14, further comprising one or more antifungals (I).

16. A dispersion according to claim 15, further comprising one or more antifoams (J).

17. A dispersion according to claim 16, further comprising one or more stabilizers or thickeners (K).

18. A dispersion according to claim 17, further comprising one or more bases (L).

19. A putty, sealing material, film, paint or coating comprising a dispersion according to claim 1.

* * * * *